US012545426B2

(12) United States Patent
Kennedy (10) Patent No.: US 12,545,426 B2
(45) Date of Patent: Feb. 10, 2026

(54) SYSTEMS AND METHODS FOR A HOSE REEL

(71) Applicant: The Boeing Company, Arlington, VA (US)

(72) Inventor: Elias Roger Kennedy, Yukon, OK (US)

(73) Assignee: The Boeing Company, Arlington, VA (US)

(*) Notice: Subject to any disclaimer, the term of this patent is extended or adjusted under 35 U.S.C. 154(b) by 257 days.

(21) Appl. No.: 18/363,825

(22) Filed: Aug. 2, 2023

(65) Prior Publication Data

US 2025/0042569 A1    Feb. 6, 2025

(51) Int. Cl.
*B64D 39/02* (2006.01)
*B65H 75/42* (2006.01)
*B65H 75/48* (2006.01)

(52) U.S. Cl.
CPC .......... *B64D 39/02* (2013.01); *B65H 75/425* (2013.01); *B65H 75/48* (2013.01); *B65H 75/486* (2013.01); *B65H 2701/33* (2013.01)

(58) Field of Classification Search
CPC ........ B64D 39/00; B64D 39/02; B64D 39/04; B65H 75/48; B65H 75/486; B65H 75/34; B65H 75/425; B65H 75/4478; B65H 75/4481; B65H 2701/33; B67D 7/40
USPC .......................................... 244/135; 242/371
See application file for complete search history.

(56) References Cited

U.S. PATENT DOCUMENTS

| | | | | | |
|---|---|---|---|---|---|
| 1,654,424 | A | * | 12/1927 | Heath | A63D 15/16 |
| | | | | | 242/380 |
| 1,746,995 | A | * | 2/1930 | Edwards | B65H 75/4471 |
| | | | | | 242/379.2 |
| 2,071,174 | A | * | 2/1937 | Parker | B05B 7/24 |
| | | | | | 285/190 |
| 2,443,276 | A | * | 6/1948 | Seevers | B64D 39/02 |
| | | | | | 244/3 |
| 2,954,190 | A | * | 9/1960 | Le | B64D 39/02 |
| | | | | | 242/390.8 |
| 2,973,163 | A | * | 2/1961 | Goodliffe | B64D 39/02 |
| | | | | | 244/3 |
| 3,033,488 | A | * | 5/1962 | Weber | H02G 11/02 |
| | | | | | 254/364 |

(Continued)

FOREIGN PATENT DOCUMENTS

GB     2469635 A     10/2010

*Primary Examiner* — Anna M Momper
*Assistant Examiner* — Raveen J Dias
(74) *Attorney, Agent, or Firm* — Joseph M. Butscher; Carroll, Hoette & Butscher, LLC (57) ABSTRACT

A method, an apparatus, and an aircraft may include a hose reel configured to attach to a first end of a hose, wherein the hose may be further configured to wrap around the hose reel, and wherein the hose reel may be configured to spin. A drogue may be configured to attach to a second end of the hose. At least one spring coupled to the hose reel may be configured to provide a constant force, wherein the hose reel spins in a first direction to allow the hose to protract when the drogue receives a first force that is greater than the constant force of the at least one spring, and wherein the hose reel spins in a second direction to allow the hose to retract when the drogue receives a second force that is less than the constant force of the at least one spring.

20 Claims, 7 Drawing Sheets

(56) References Cited

U.S. PATENT DOCUMENTS

| | | | | |
|---|---|---|---|---|
| 3,216,529 | A * | 11/1965 | Lohr | F03G 1/022 185/39 |
| 3,674,049 | A * | 7/1972 | Macgregor | B64D 39/02 137/355.2 |
| 3,889,896 | A * | 6/1975 | O'Hara | B65H 75/36 242/396.9 |
| 4,187,962 | A * | 2/1980 | Henry | B67D 7/04 222/626 |
| 4,427,163 | A * | 1/1984 | Kondziola | B60R 22/34 242/375.3 |
| 4,446,884 | A * | 5/1984 | Rader, Jr. | B65H 75/38 137/355.23 |
| 4,530,474 | A * | 7/1985 | Nederman | B65H 75/44 242/396.5 |
| 4,813,627 | A * | 3/1989 | Nelson | B65H 75/4428 242/373 |
| 4,905,937 | A | 3/1990 | Spotswood et al. | |
| 5,104,056 | A * | 4/1992 | Jannotta | G01F 23/0023 73/321 |
| 5,141,178 | A * | 8/1992 | Alden | B65H 75/34 244/135 A |
| 6,149,094 | A | 11/2000 | Martin et al. | |
| 6,685,602 | B2 * | 2/2004 | Colosky, Jr. | A63B 23/00 482/904 |
| 7,887,010 | B2 | 2/2011 | Takacs et al. | |
| 8,459,593 | B2 | 6/2013 | Richardson | |
| 8,727,084 | B1 * | 5/2014 | Kuker | B65H 75/425 242/378.2 |
| 9,284,061 | B2 | 3/2016 | Kutzmann | |
| 9,969,502 | B2 * | 5/2018 | De la Fuente Lopez | B64D 39/00 |
| 10,000,967 | B2 * | 6/2018 | Huang | E06B 9/322 |
| 10,099,799 | B2 * | 10/2018 | Hughes | H01B 11/1033 |
| 10,807,734 | B2 * | 10/2020 | Larson | B65H 59/38 |
| 10,947,778 | B2 * | 3/2021 | Huang | E06B 9/322 |
| 2009/0200426 | A1 * | 8/2009 | Schroeder | F16L 3/26 244/135 A |
| 2014/0346279 | A1 * | 11/2014 | Foo | B64D 39/02 244/135 A |
| 2017/0073080 | A1 * | 3/2017 | Hughes | B64D 39/06 |
| 2017/0275015 | A1 * | 9/2017 | Guerquin | B64D 39/02 |
| 2017/0275016 | A1 * | 9/2017 | Guerquin | B65H 75/4402 |
| 2018/0319621 | A1 * | 11/2018 | Sevigny | B65H 57/14 |
| 2020/0307802 | A1 * | 10/2020 | Wilcynski | B65H 75/4428 |
| 2021/0061493 | A1 * | 3/2021 | Pattison | B64D 39/02 |

* cited by examiner

Equations:

$$P = \frac{Ebt^3}{cD_n^2} \quad \text{For } N \leq 10$$

$$P = \frac{Ebt^3}{cD_1}\left(\frac{2}{D_n} - \frac{1}{D_1}\right) \quad \text{For } N > 10$$

$$S = \frac{Et}{D_n}$$

Where:
P = Load (N, lbs)
E = Modulus of Elasticity (Pa, psi)
$D_1$ = outside coil diameter (mm, in)
$D_0$ = drum diameter (mm, in)
b = Spring Width (mm, in)
c = Design constant factor - to compensate for the cross curvature occurring in the extension form (material design characteristic)
$D_n$ = Diameter 1, 2 or 3 (mm, in)
N = Number of coil turns
b = Width mm (mm, in)
t = Thickness (mm, in)
S = Stress Mpa (psi)

MULTIPLE MOUNTING

Force is the sum of two or more springs

Back to Back - Most stable mounting

Laminar - Offers sum of forces in a limited space

Tandem - this configuration does not add stability

SYSTEMS AND METHODS FOR A HOSE REEL

FIELD

The present disclosure relates generally to airplanes and more particularly to improved mid-air fueling systems.

BACKGROUND

Some devices, such as a Boom Drogue Adaptor (BDA), may be used to refuel vehicles (e.g., aircraft, trucks, boats, submarines, etc.) while they are moving. For instance, a BDA may be coupled to an aircraft, which when the aircraft is in flight, may be used to refuel another aircraft that is also in flight. This may be beneficial for longer flights.

SUMMARY

In one example implementation, a method, can include but is not limited to attaching a hose reel to a first end of a hose, wherein the hose cab be configured to wrap around the hose reel, and wherein the hose reel can be configured to spin. A drogue can be attached to a second end of the hose. At least one spring to the hose reel to provide a constant force, wherein the hose reel spins in a first direction to allow the hose to protract when the drogue receives a first force that is greater than the constant force of the at least one spring, and wherein the hose reel spins in a second direction to allow the hose to retract when the drogue receives a second force that is less than the constant force of the at least one spring.

One or more of the following example features may be included. The at least one spring can include a mainspring. The at least one spring can include a back-to-back mounting. The at least one spring can include a laminar spring. The at least one spring can include a tandem configuration. The hose reel can be covered in an aerodynamic pod. A governor can be configured to regulate a protraction rate and a retraction rate of the hose. The hose reel can be placed in an aerodynamic pod. A ram air turbine can be attached to a forward end of an aerodynamic pod and can be configured to provide power to a light coupled to the aerodynamic pod.

In another example implementation, an apparatus can include but is not limited to a hose reel configured to attach to a first end of a hose, wherein the hose may be further configured to wrap around the hose reel, and wherein the hose reel can be configured to spin. A drogue can be configured to attach to a second end of the hose. At least one spring coupled to the hose reel can be configured to provide a constant force, wherein the hose reel spins in a first direction to allow the hose to protract when the drogue receives a first force that is greater than the constant force of the at least one spring, and wherein the hose reel spins in a second direction to allow the hose to retract when the drogue receives a second force that is less than the constant force of the at least one spring.

One or more of the following example features may be included. The at least one spring can include a mainspring. The at least one spring can include a back-to-back mounting. The at least one spring can include a laminar spring. The at least one spring can include a tandem configuration. The hose reel can be covered in an aerodynamic pod. A governor can be configured to regulate a protraction rate and a retraction rate of the hose. A ram air turbine coupled to a forward end of an aerodynamic pod can be configured to provide power to a light coupled to the aerodynamic pod.

In another example implementation, an aircraft can include but is not limited to a hose reel configured to attach to a first end of a hose, wherein the hose can be further configured to wrap around the hose reel, and wherein the hose reel can be configured to spin. A drogue can be configured to attach to a second end of the hose. At least one spring coupled to the hose reel can be configured to provide a constant force, wherein the hose reel spins in a first direction to allow the hose to protract when the drogue receives a first force that is greater than the constant force of the at least one spring, and wherein the hose reel spins in a second direction to allow the hose to retract when the drogue receives a second force that is less than the constant force of the at least one spring.

One or more of the following example features may be included. The at least one spring can include a mainspring. The at least one spring can include a back-to-back mounting. The at least one spring can include a laminar spring. The at least one spring may include a tandem configuration. The hose reel can be covered in an aerodynamic pod. A governor can be configured to regulate a protraction rate and a retraction rate of the hose. A ram air turbine coupled to a forward end of an aerodynamic pod can be configured to provide power to a light coupled to the aerodynamic pod.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF DRAWINGS

Like reference symbols in the various drawings may indicate like elements.

DESCRIPTION

As noted above, some devices, such as a Boom Drogue Adaptor (BDA), may be used to refuel vehicles (e.g., aircraft, unmanned aerial vehicles (UAV), rotorcraft, trucks, boats, submarines, etc.) while they are moving. For instance, a BDA can be coupled to an aircraft, which when the aircraft is in flight, may be used to refuel another aircraft that is also in flight. This may be beneficial for longer flights. Some BDA systems may have a limited refueling envelope, zero hose response, and a very heavy basket. Additionally, some BDA systems also have the limitation of a short 9 ft hose that hangs off the back of an aircraft. The BDA was designed this way so that the drogue basket does not drag along the runway during takeoff and landing, and so that it can stay aerodynamically stable with the short hose. Pilots flying receiver aircraft can have difficulty refueling from the BDA system due to the very small refueling envelope and lack of hose response when connecting to it. The heavy basket needed for stability and lack of hose response from a slack take up reel may end up severely damaging the receiver aircraft at times, by having the hose hitting the receiver's canopy or refueling probe.

Some aircraft may be configured with multi-point refueling system (MPRS) pods on the ends of each wing. These are large pods that can let out a hose and drogue for refueling and have slack take up reels. These pods may be permanent modifications to the aircraft structure and may require extensive structural and system changes to the aircraft to install. Some BDAs may be considered stiff and have no hose reel, which may make it difficult from which to refuel and may easily whip around and strike receiver aircraft; however, it requires no electricity or hydraulics and can be easily attached to and removed from the boom to configure it from hose and drogue refueling to boom refueling, which makes it a nice solution for aircraft without MPRS.

Some refueling systems may have a hose made of a stretchable material, so during slow speeds (such as takeoff and landing), it would be retracted, and then during fast speeds for refueling, extended (protracted). Unfortunately, the flexible stretchy hose may easily twist and kink in the air as the heavy drogue on the end twists in the air stream. Some refueling systems may have a softer basket to address this issue; however, making the basket softer for the BDA system may make it more susceptible to bow wave forces coming from the nose of the receiver and may make it significantly more difficult to connect to. As well, the BDA is typically unable to retract and store the basket into a pod, and thus the basket is always subject to aerodynamic forces. A soft basket likely is not able to withstand the constant aerodynamic forces and there may be a significant risk of it breaking. Therefore, as will be discussed in greater detail below, the present disclosure may provide an improved refueling system, which can include a refueling hose reel attached to a constant force spring, such that the constant force spring applies a constant tensioning force to the hose reel without need for electrical power or hydraulics to unwind or retract a hose/drogue assembly. Based on the air loads (e.g., the force of drag rate based on air speed), the hose may unwind or retract for BDA-type (or similar) systems. That is, the present disclosure may enable the hose to extend longer and provide slack take up during refueling speeds while retracting or staying retracted during landing and takeoff speeds. This can significantly increase the current refueling envelope and dampen out hose whipping.

As discussed above and referring also at least to the example implementations of FIGS. 1-5, assembly process 10 can attach 100 a hose reel to a first end of a hose, wherein the hose can be configured to wrap around the hose reel, and wherein the hose reel can be configured to spin. Assembly process 10 can attach 102 a drogue to a second end of the hose. Assembly process 10 can attach 104 at least one spring to the hose reel to provide a constant force, wherein the hose reel spins in a first direction to allow the hose to protract when the drogue receives a first force that is greater than the constant force of the at least one spring, and wherein the hose reel spins in a second direction to allow the hose to retract when the drogue receives a second force that is less than the constant force of the at least one spring.

Figure 2A:
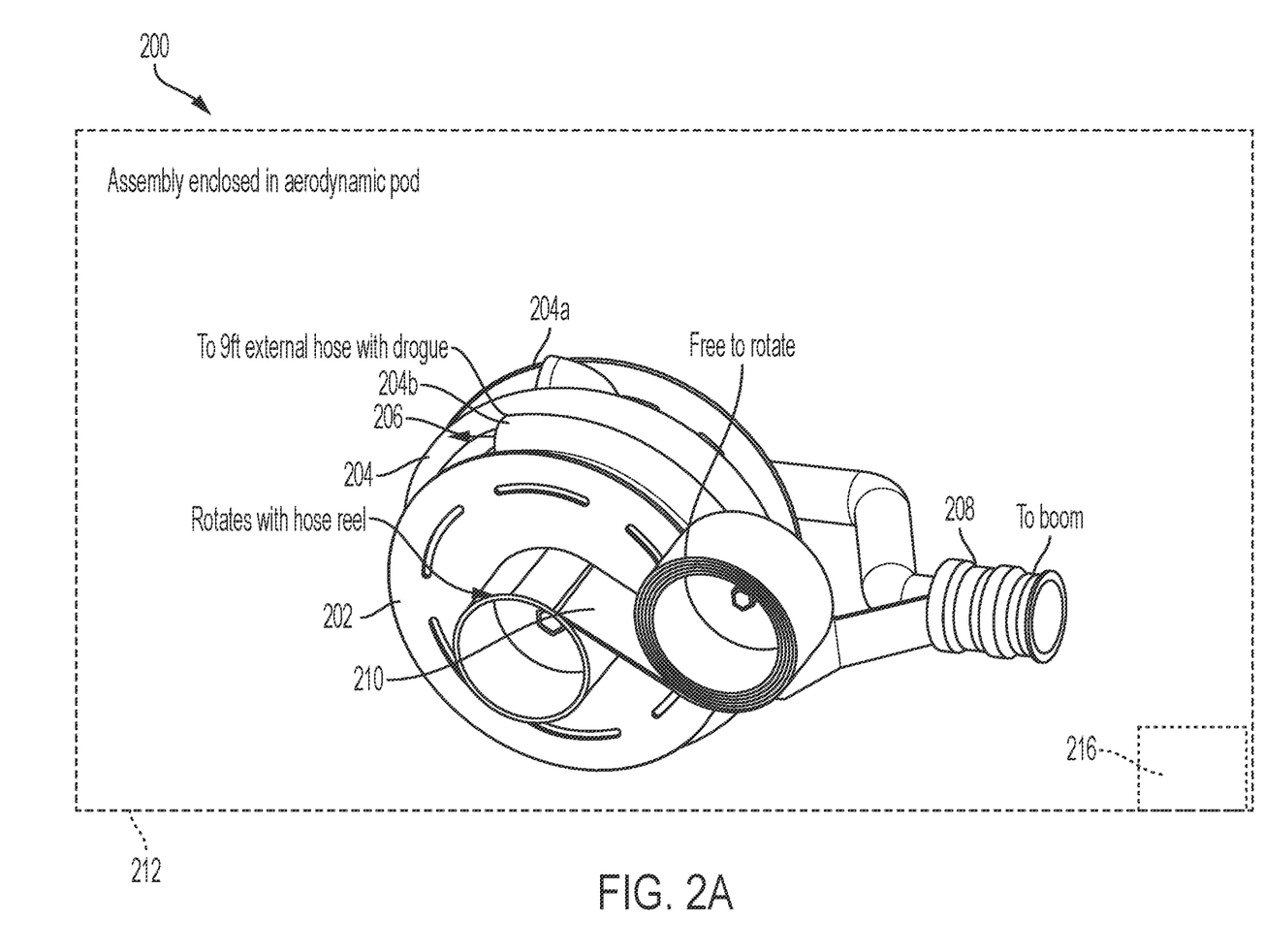
FIGS. 2A-C are example diagrammatic views of a refueling hose reel according to one or more example implementations of the disclosure.
Figure 2B:
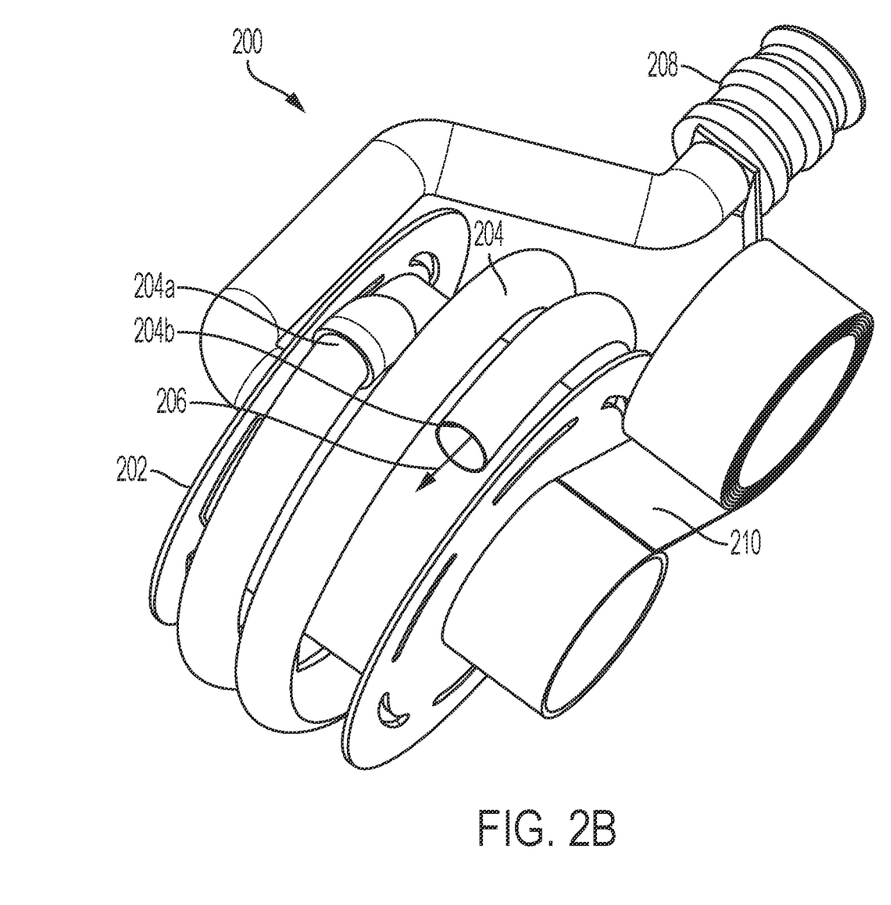
Figure 2C:
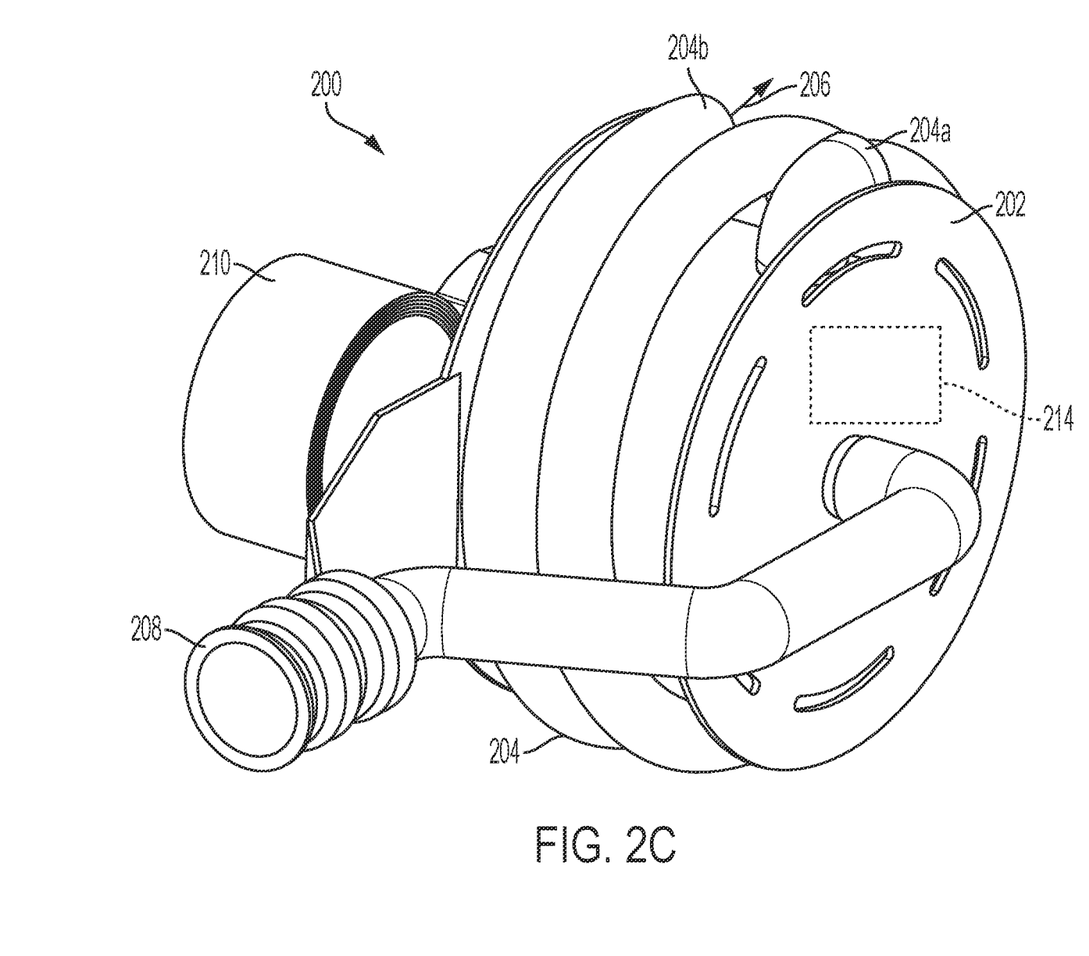

For example, referring to the example implementations of FIGS. 2A-2C, alternative views of a refueling system (e.g., refueling system 200) are shown. Refueling system 200 can include a hose reel (e.g., hose reel 202), a hose (e.g., hose 204 with a first end 204a and a second end 204b), a drogue (e.g., drogue 206), a coupling (e.g., coupling 208), and a spring (e.g., spring 210). In some implementations, assembly process 10 can attach 100 hose reel 202 to first end 204a of hose 204, wherein hose 204 can be configured to wrap around hose reel 202, and wherein hose reel 202 can be configured to spin, and in some implementations, assembly process 10 can attach 102 drogue 206 to second end 204b of hose 204. For instance, a spindle or axel design can be used such that first end 204a of hose 204 is attached to a liquid/gas input portion of hose reel 202. Liquid (e.g., gas, fuel, water, etc.) can be received via a coupling (e.g., coupling 208) to a boom, which can then enter first end 204a of hose 204. The boom can receive the liquid from a liquid reserve (e.g., fuel reservoir), and the liquid can flow through an arm to first end 204a of hose 204 until it reaches second end 204b of hose 204. Drogue 206 can be attached to second end 204b of hose 204 to help protract (extend) hose 204, as will be discussed in greater detail below. Hose reel 202 enables hose 204 to wrap around the spindle or extend as it rotates in respective directions. In some implementations, spring 210 can be connected to each drum by being welded, riveted, or fastened with bolts/screws, or the like. The storage drum that the spring starts coiled up in is attached to the system with an axel that is free to spin. The second drum goes through the centerline of the hose reel and is attached to the hose reel so that they spin together. This drum can be bolted, welded, etc. to the hose reel.

In some implementations, assembly process 10 can attach 104 at least one spring (e.g., spring 210) to hose reel 202 to provide a constant force, wherein hose reel spins in a first direction (e.g., clockwise) to allow hose 204 to protract when drogue 206 receives a first force that is greater than the constant force of spring 210, and wherein hose reel 202 spins in a second direction (e.g., counter clockwise) to allow hose 204 to retract when drogue 206 receives a second force that is less than the constant force of spring 210. For instance, assume for example purposes only that refueling system 200 is used on an aircraft. In some implementations, a special constant force spring motor (e.g., spring 210) can be mounted to the side of hose reel 202. During takeoff and landing when the aircraft is moving slow, the spring force in spring 210 will keep hose 204 and drogue 206 retracted so that it does not drag along the runway. Once the aircraft is at refueling speeds, the increased speed would increase the drag forces on drogue 206, which would overcome the power of spring 210, causing it to "unreel" and extend. When the receiver aircraft flies their probe into drogue 206 for refueling, any slack that develops in the hose from them pushing into the drogue would then be reeled in by spring 210. Thus, the refueling aircraft can use refueling system 200 to provide mid-air refueling to the receiver aircraft. The refueling aircraft uses airspeed/drag force to extend the hose, enabling the hose to connect to the receiver aircraft's fuel tank, receive the fuel from the refueling aircraft, and once refueling is complete, retract the hose from the receiver aircraft based on a slower airspeed/drag force.

In some implementations, assembly process 10 can place 108 of the hose reel in an aerodynamic pod, such that the hose reel can be covered in the aerodynamic pod. For instance, hose reel 202 and spring 210 can be compact and light enough to be enclosed in an aerodynamic pod (e.g., pod 212) and to not overload the boom with weight. The components needed to create hose reel 202 and spring 210 can be made with lightweight materials. After reading the present disclosure, it will be appreciated that the aerodynamic pod may need brackets extending from parts of the hose reel to which the aerodynamic pod would attach. Otherwise, the part that attaches to the boom may protrude out from the aerodynamic pod and the end of the hose where the drogue is may dangle out the other end of the aerodynamic pod.

As noted above, hose reel 202 can include a spring motor operated reel, which allows for a longer hose during boom hose and drogue refueling and includes a hose slack take up reel, while not requiring the extensive modifications and power requirements of wing mounted refueling pods. Hose reel 202 need not have a flexible stretchy hose that would twist and kink in the air, and could use standard refueling hoses.

Figure 3:
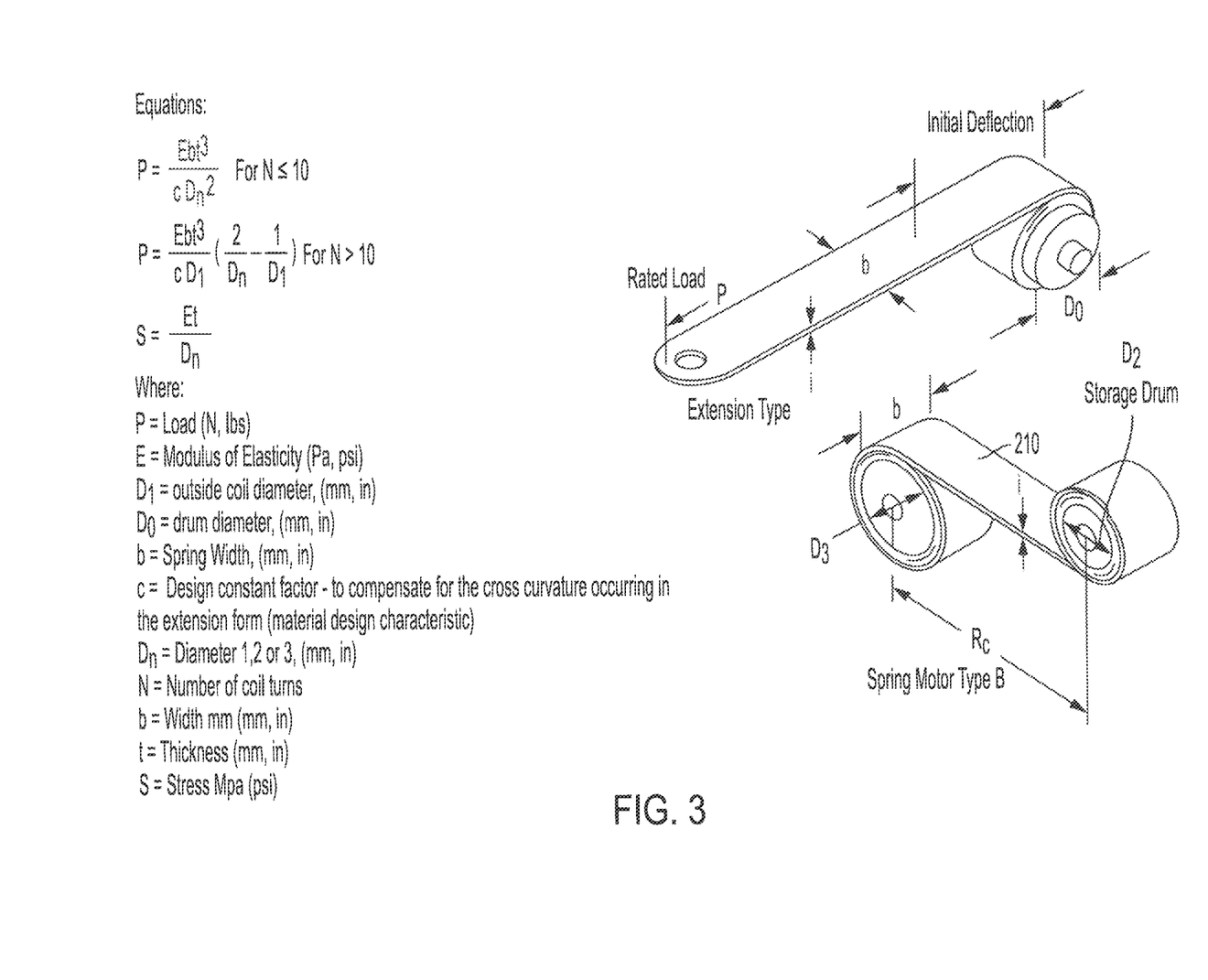
FIG. 3 is an example diagrammatic view of a spring motor used in a refueling hose reel according to one or more example implementations of the disclosure.
Figure 4:
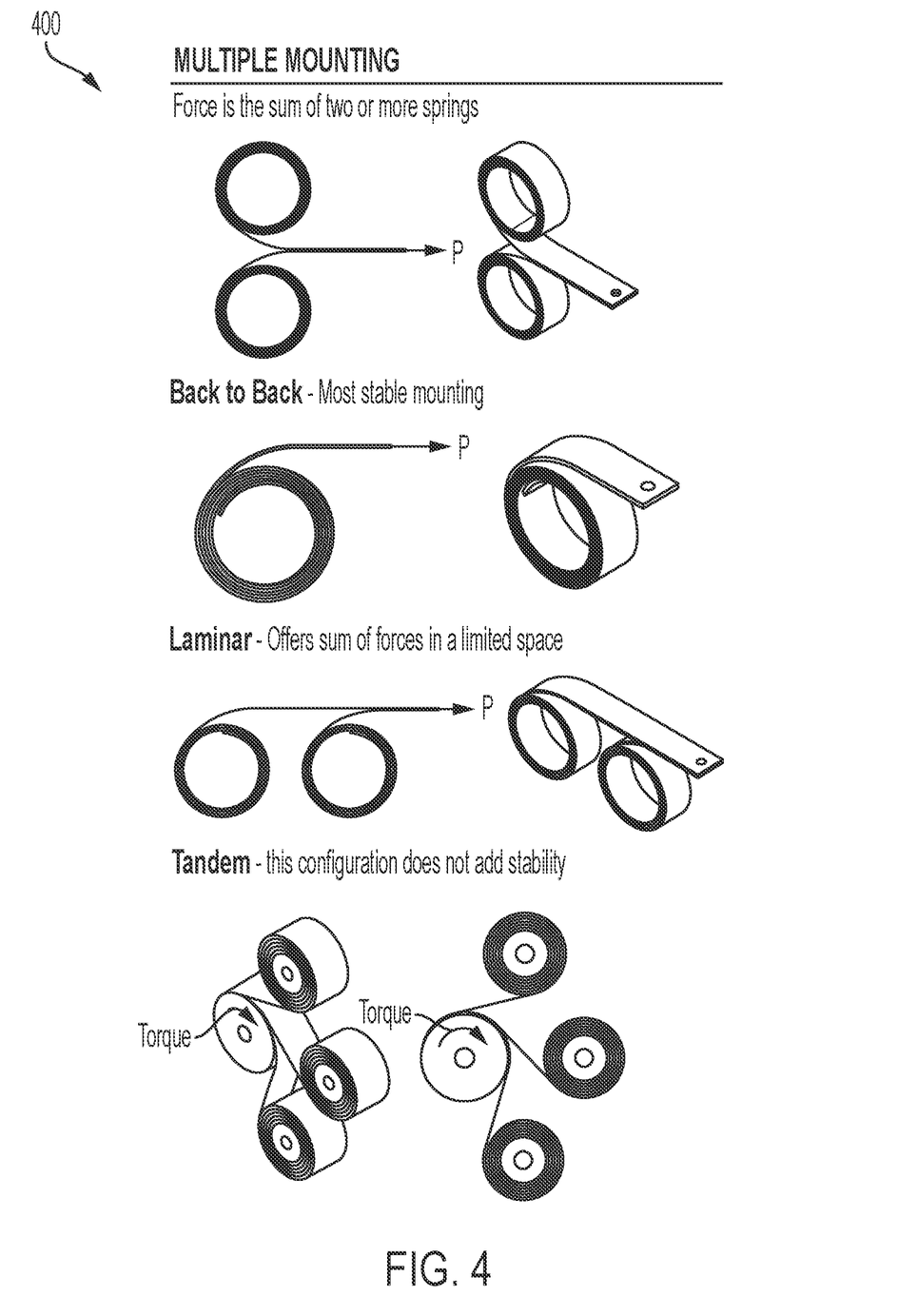
FIG. 4 is an example diagrammatic view of different example spring motors used in a refueling hose reel according to one or more example implementations of the disclosure.

It will be appreciated that spring 210 needs to be strong enough to keep hose 204 (via hose reel 202) retracted during takeoff and landing so that the basket does not drag along the ground, and the air drag forces need to be strong enough during flight speeds to unwind hose 204 from hose reel 202. In some implementations, this may be accomplished in a small enough aerodynamic enclosure (pod) that can be supported by the structure of the boom, discussed further below. An explanation of the calculations that can be used to determine the desired spring forces (and therefore spring design) required to extend and retract hose 204 during takeoff/landing and refueling speeds is shown in FIG. 3.

In some implementations, spring 210 can include a mainspring. For instance, and referring at least to the example implementation of FIG. 4, multiple spring types 400 are shown. One way to significantly reduce the size of the system is to use a mainspring (e.g., a circular spring like one may see in a clock or badge holder retractable cord) inside hose reel 202, instead of (or in addition to) the constant force spring motor shown in FIG. 2. This type of spring, however, may have forces that change with how much the spring deflects and typically has diminishing performance after its first full revolution. As a result, this can make the retraction and extension of hose 204 less predictable and controllable. It will be appreciated based upon the present disclosure that other types of springs and combinations thereof can be used without departing from the scope of the present disclosure. For instance, in some implementations, spring 210 can include a back-to-back mounting, a laminar spring, a tandem configuration, or combinations thereof.

Figure 5:
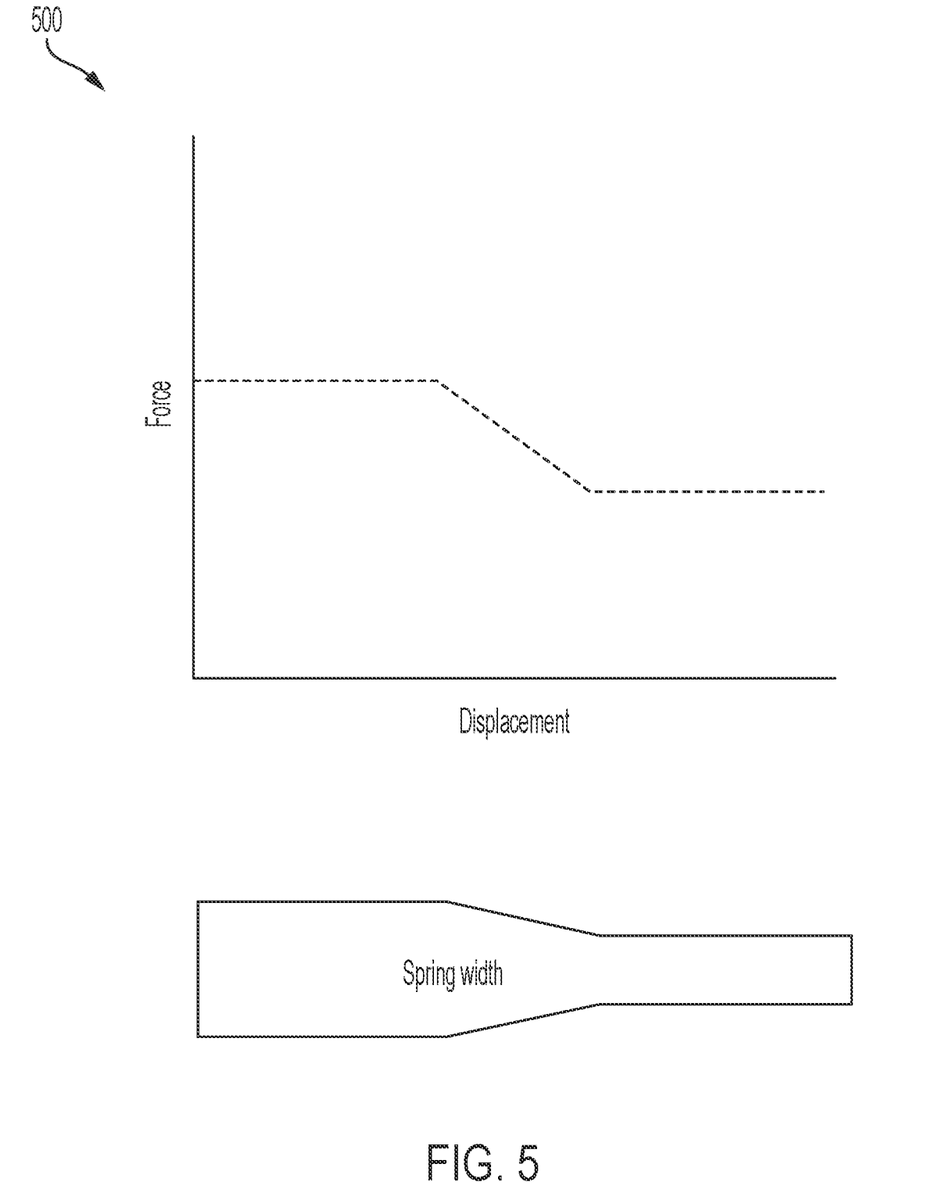
FIG. 5 is an example diagrammatic view of a force v. displacement graph for an example spring motor used in a refueling hose reel according to one or more example implementations of the disclosure.

In some implementations, additional features and advantages of the present disclosure are that the cross section of the metal spring strip can be different at specific extension lengths to achieve different forces pulling back on the reel. It might be discovered that having more or less force in the hose reel is desirable when the receiver is making constant contact with the drogue, so the spring at those specific lengths can have a different cross section to achieve those desired values. For instance, and referring to FIG. 5 (chart 500 showing force v. displacement based upon spring width) and by looking at the associated equation in FIG. 3, the amount of force that the spring pulls back on depends on how wide the spring is. The spring would be sized so that at a specific speed, the drag force would overcome the spring force. But as the hose reel extends, that spring will unravel from the drum and if the width ever changes as it unspools, the force that the spring pulls back with changes also. For example, the first few feet of the spring could be very wide, which requires a very fast airspeed in order to generate enough drag force to pull it free. But the last few feet of the spring in the reel could be much narrower, which results in needing to go much slower to have it retract back. This makes it so that one does not have to continue going at that very fast speed to keep it extended, and one may have a different required speed to extend or retract based off the cross section of that spring. Thus, FIG. 5 shows that with a wide spring, the force required to displace is high, then when the spring is narrow, that force required to displace is lessened.

In some implementations, assembly process 10 can, via a governor, regulate 106 a protraction rate and a retraction rate of the hose. For instance, the inside of hose reel 202 can also include safety measures, like a speed governor (e.g., governor 214 shown in FIG. 2C) that can limit the extension and retraction rates of hose 204 and drogue 206 in case of any failures with the refueling system, where it may be undesirable to have hose 204 rapidly extend or retract. In some implementations, there may be a lot of empty space inside the hose reel drum, and the governor may fit inside there. The governor can spin with the hose drum as it is extended and may be sized so that if it spins too fast, the centrifugal force would make it brake. This is typically done by having fly weights extend out with faster speeds, which can then push a brake plate against the drum to slow it down. The governor is meant to be a safety feature that may make it so if the spring were to break, the drogue would not rapidly extend and strike an aircraft without them having enough time to react.

In some implementations, assembly process 10 can attach 110 a ram air turbine to a forward end of an aerodynamic pod, such that the ram air turbine can be configured to provide power to a light coupled to the aerodynamic pod. For example, and referring again to FIG. 2A, refueling system 200 can include a small ram air turbine (RAT), such as RAT 216, at the forward end of enclosure pod 212. RAT may be generally described as a small fan that powers an electric motor while flying, as the force of the air is used to spin the fan. This electric motor can power a light on enclosure pod 212 for visibility. Fiber optic cables can be wrapped around hose 204 and terminate at the basket. Unlike current techniques where a BDA has reflective tape on the drogue where the receiver pilot must shine their own light at the drogue in order to illuminate it, the light from the RAT can then enter the fiber optic cable and illuminate hose 204 and drogue 206 for nighttime visibility during refueling.

Therefore, the present disclosure can enable using a longer hose and/or provide hose slack take-up capability by including a small reel to the current BDA system that has a special type of spring motor that can make the hose longer during refueling speeds and provide slack take-up, while retracting during landing and takeoff speeds. The constant force spring always provides the same force on the hose based on the air loads (e.g., consider changes in force of drag rate over various speeds/phases of flight) to unwind or retract the hose for BDA-type systems. That is, the spring motor actuates from retracted to extended purely based on aircraft speed and requires zero electricity or hydraulics to function, although electricity and hydraulics may still be added if desired. This increases the size of the refueling envelope by changing where the position of the hose and drogue are in the airstream.

Figure 1:
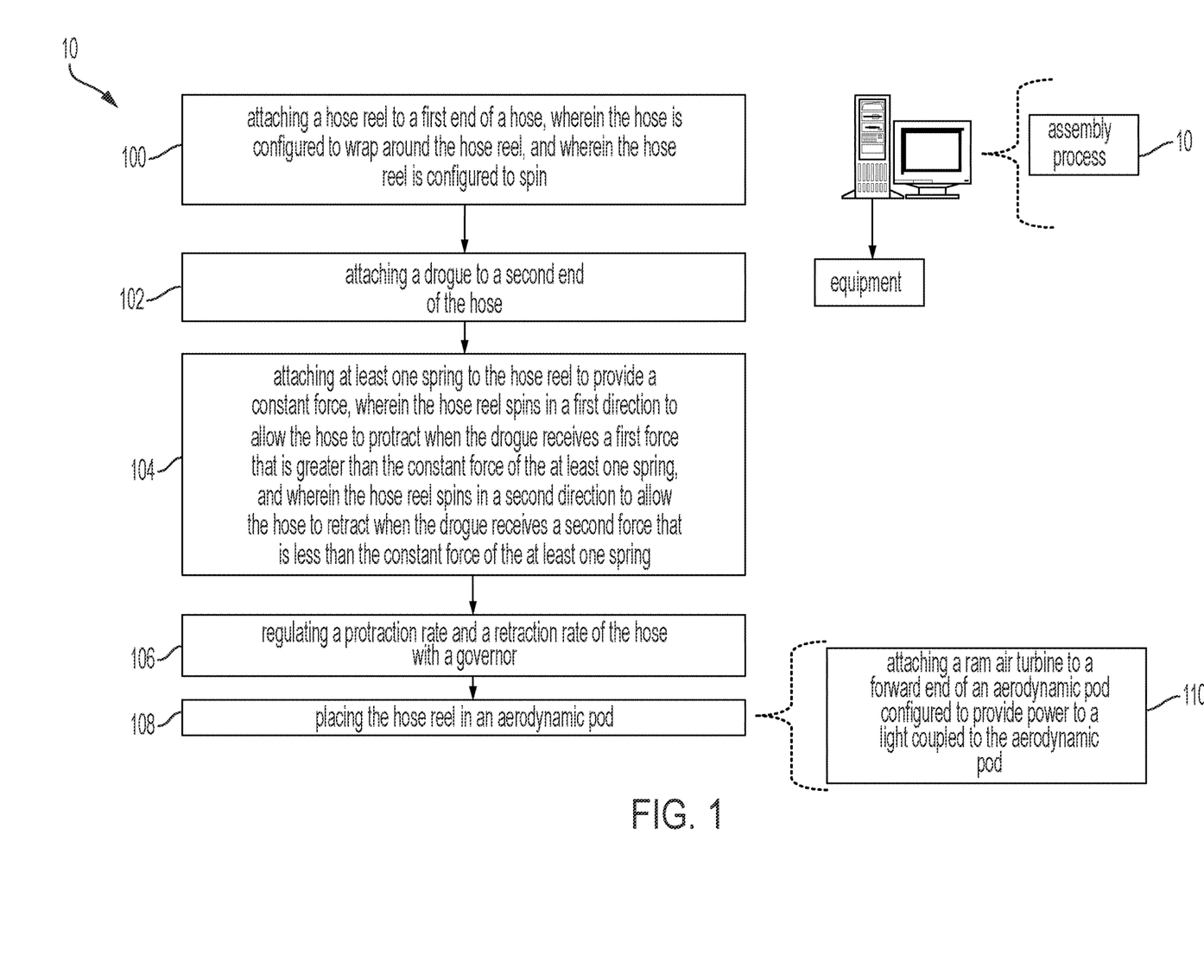
FIG. 1 is an example flowchart of an assembly process according to one or more example implementations of the disclosure.

It will be appreciated that any standard refueling system assembly/printing/fabrication, etc. equipment, as well as any other necessary equipment, may be used singly or in any combination with assembly process 10, which may be operatively connected to a computing device, such as the computing device shown in FIG. 1, to obtain their instructions. In one or more example implementations, the respective flowcharts may be manually implemented, computer-implemented, or a combination thereof. As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as JavaScript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A and B" (and the like) as well as "at least one of A or B" (and the like) should be interpreted as covering only A, only B, or both A and B, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The terms "coupled," "attached," or "connected" used herein is to refer to any type of relationship, direct or indirect, between the components in question, and is to apply to electrical, mechanical, fluid, optical, electromagnetic, electromechanical, or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action is to occur, either in a direct or indirect manner.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated. The features of any dependent claim may be combined with the features of any of the independent claims or other dependent claims.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. An apparatus comprising:
   a hose reel configured to attach to a first end of a hose, wherein the hose is further configured to wrap around the hose reel, and wherein the hose reel is configured to spin;
   a drogue configured to attach to a second end of the hose; and
   at least one spring coupled to the hose reel configured to provide a constant force, wherein the at least one spring comprises one or more portions that are coaxial with the hose reel, wherein the one or more portions of the at least one spring spin along with the hose reel, wherein the hose reel spins in a first direction to allow the hose to protract when the drogue receives a first force that is greater than the constant force of the at least one spring, and wherein the hose reel spins in a second direction to allow the hose to retract when the drogue receives a second force that is less than the constant force of the at least one spring.

2. The apparatus of claim 1, wherein the at least one spring includes a mainspring.

3. The apparatus of claim 1, wherein the at least one spring includes a back-to-back mounting.

4. The apparatus of claim 1, wherein the at least one spring includes a laminar spring.

5. The apparatus of claim 1, wherein the at least one spring includes a tandem configuration.

6. The apparatus of claim 1, wherein the hose reel is covered in an aerodynamic pod.

7. The apparatus of claim 1 further comprising a governor configured to regulate a protraction rate and a retraction rate of the hose.

8. The apparatus of claim 1 further comprising a ram air turbine coupled to a forward end of an aerodynamic pod configured to provide power.

9. An aircraft comprising:
   a hose reel configured to attach to a first end of a hose, wherein the hose is further configured to wrap around the hose reel, and wherein the hose reel is configured to spin;
   a drogue configured to attach to a second end of the hose; and
   at least one spring coupled to the hose reel configured to provide a constant force, wherein the at least one spring comprises one or more portions that are coaxial with the hose reel, wherein the one or more portions of the at least one spring spin along with the hose reel, wherein the hose reel spins in a first direction to allow the hose to protract when the drogue receives a first force that is greater than the constant force of the at least one spring, and wherein the hose reel spins in a second direction to allow the hose to retract when the drogue receives a second force that is less than the constant force of the at least one spring.

10. The aircraft of claim 9, wherein the at least one spring includes a mainspring.

11. The aircraft of claim 9, wherein the at least one spring includes a back-to-back mounting.

12. The aircraft of claim 9, wherein the at least one spring includes a laminar spring.

13. The aircraft of claim 9, wherein the at least one spring includes a tandem configuration.

14. The aircraft of claim 9, wherein the hose reel is covered in an aerodynamic pod.

15. The aircraft of claim 9 further comprising a governor configured to regulate a protraction rate and a retraction rate of the hose.

16. The aircraft of claim 9 further comprising a ram air turbine coupled to a forward end of an aerodynamic pod configured to provide power.

17. A method of manufacturing a hose reel comprising:
   attaching a hose reel to a first end of a hose, wherein the hose is configured to wrap around the hose reel, and wherein the hose reel is configured to spin;
   attaching a drogue to a second end of the hose; and
   attaching at least one spring to the hose reel to provide a constant force, wherein the at least one spring comprises one or more portions that are coaxial with the hose reel, wherein the one or more portions of the at least one spring spin along with the hose reel, wherein the hose reel spins in a first direction to allow the hose to protract when the drogue receives a first force that is greater than the constant force of the at least one spring, and wherein the hose reel spins in a second direction to allow the hose to retract when the drogue receives a second force that is less than the constant force of the at least one spring.

18. The method of claim 17 further comprising regulating a protraction rate and a retraction rate of the hose with a governor.

19. The method of claim 17 further comprising placing the hose reel in an aerodynamic pod.

20. The method of claim 19 further comprising attaching a ram air turbine to a forward end of an aerodynamic pod configured to provide power.

* * * * *